(12) United States Patent
Hazelton et al.

(10) Patent No.: US 7,513,246 B2
(45) Date of Patent: Apr. 7, 2009

(54) POSITIVE CRANKCASE VENTILATION DEVICE AND SYSTEM

(75) Inventors: Gary J. Hazelton, White Lake, MI (US); Leonard Barry Griffiths, Fenton, MI (US)

(73) Assignee: GM Global Technoloy Operations, Inc., Detroit, MI (US)

( * ) Notice: Subject to any disclaimer, the term of this patent is extended or adjusted under 35 U.S.C. 154(b) by 30 days.

(21) Appl. No.: 11/432,097

(22) Filed: May 11, 2006

(65) Prior Publication Data

US 2007/0261684 A1 Nov. 15, 2007

(51) Int. Cl.
F02B 25/06 (2006.01)

(52) U.S. Cl. .................................... 123/572

(58) Field of Classification Search ......... 123/572–574, 123/41.86
See application file for complete search history.

(56) References Cited

U.S. PATENT DOCUMENTS

| | | | | |
|---|---|---|---|---|
| 2,355,182 A * | 8/1944 | Shoup | ..... | 455/301 |
| 2,853,995 A * | 9/1958 | Marks et al. | ..... | 126/110 E |
| 2,971,505 A * | 2/1961 | Fortney | ..... | 123/572 |
| 3,111,120 A * | 11/1963 | Cornell | ..... | 123/572 |
| 3,111,138 A * | 11/1963 | Humphreys et al. | ..... | 137/480 |
| 3,754,538 A * | 8/1973 | Ephraim et al. | ..... | 123/41.86 |
| 4,090,477 A * | 5/1978 | Gockel | ..... | 123/406.11 |
| 4,172,437 A * | 10/1979 | Lindberg | ..... | 123/574 |
| 4,237,840 A * | 12/1980 | Figueiras | ..... | 123/568.15 |
| 4,240,250 A * | 12/1980 | Harris | ..... | 60/39.093 |
| 4,515,137 A * | 5/1985 | Manolis | ..... | 123/572 |
| 4,779,601 A * | 10/1988 | Dallman | ..... | 123/572 |
| 4,958,613 A * | 9/1990 | Hiraoka et al. | ..... | 123/572 |
| 5,901,750 A * | 5/1999 | Kozinski | ..... | 138/45 |
| 6,619,276 B1 * | 9/2003 | Miller et al. | ..... | 123/572 |
| 6,782,878 B2 | 8/2004 | Spix | ..... | 123/572 |
| 2006/0000459 A1 * | 1/2006 | Freeman et al. | ..... | 123/574 |

* cited by examiner

*Primary Examiner*—M. McMahon

(57) ABSTRACT

A PCV device for recirculation of crankcase air has a structural member with a tubular, substantially linear internal flow passage characterized by a length and diameter with a ratio of length to diameter that attenuates noise and acts as a restrictive orifice to at least partially control flow volume therethrough. A PCV system for an engine includes a structural member as described above placed in fluid communication with a passage member to partially form a flow path between an interior portion of an engine crankcase and an air intake portion of the engine. The flow path has an absence of any flow restriction with a diameter smaller than the diameter of the structural member.

9 Claims, 2 Drawing Sheets

POSITIVE CRANKCASE VENTILATION DEVICE AND SYSTEM

TECHNICAL FIELD

This invention relates to a positive crankcase ventilation system and, more particularly, a positive crankcase device with improved noise attenuation.

BACKGROUND OF THE INVENTION

It is known in the art to provide positive crankcase ventilation (PCV) systems for internal combustion engines to reduce emission of contaminants by drawing crankcase vapors from the engine crankcase into the engine cylinders for burning. This is typically done by venting the vapors through a cylinder head cam cover attached to the crankcase to an intake air passage, such as an intake manifold, via a passage member such as a PCV tube. A typical PCV system may include a PCV control valve or orifice mounted in the flow path between the crankcase and the air intake portion. During engine operation, a vacuum is developed in the manifold which draws crankcase vapors through the PCV system into the manifold where it mixes with intake air to be delivered to the engine cylinders. In designing a PCV system, it is important to ensure that noise levels caused by flow through the system are acceptable and that component costs are minimized.

SUMMARY OF THE INVENTION

A positive crankcase ventilation (PCV) device is provided that attenuates noise generated by flow of re-circulating crankcase air in a PCV system. The PCV system is for an engine that has a crankcase and an air intake portion. The air intake portion may be either a manifold or the air intake passage to a cylinder. The PCV device includes a structural member having a tubular, substantially linear internal flow passage. The internal flow passage, also referred to herein as an elongated flow restriction orifice, has a diameter acting as a restrictive orifice to at least partially control flow volume through the PCV system. Preferably, a flow path from the crankcase to the air intake portion has no orifices or restrictions that are of a lesser diameter than the elongated orifice. A ratio of the length of the internal flow passage to the diameter of the internal flow passage is configured to attenuate noise generated by flow therethrough. Preferably, the ratio of length to diameter is not less than 1.5 and not greater than 3.0. Also preferably, the length of the passage is not less than 4.0 mm. The length and diameter are sized to attenuate noise while accommodating a required flow rate through the internal flow passage that is dependent upon engine size, crankcase volume, and other factors. Larger displacement engines typically require higher flow rates through the PCV orifice. The length to diameter ratio of the internal flow passage is tuned (i.e., designed) to provide the proper flow rate at the quietest operating noise level.

In one embodiment, the structural member is in the cam cover which operatively connects to the crankcase. The internal flow passage may be machined, fitted, cast or molded in the cam cover. In one embodiment, the internal flow passage, cam cover and a tubular fitting configured for attachment with a passage member such as PCV tubing are formed from the same base material as a single component, thus potentially saving component cost and assembly time. In another embodiment, the structural member is a separate component that is rigidly secured within an opening of the cam cover. For example, the structural member may be a substantially annular disk which is press-fit in a cylindrical bore in the cam cover.

In yet another embodiment, the structural member is a substantially tubular fitting which is connected between passage members to create a flow path between the crankcase and the air intake portion. The passage members may be referred to as PCV tubing. The tubular fitting preferably has opposing ends with the internal flow passage formed between the ends. At least one of the ends is adapted for connection with the PCV tubing. The other end may be also connected with the PCV tubing or may fit directly on the cam cover. Preferably, the fitting has an inlet passage at the first end and an outlet passage at the opposing second end. The diameter of the internal flow passage is less than respective diameters of the inlet and outlet passages so that the internal flow passage controls the flow rate through the structural member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
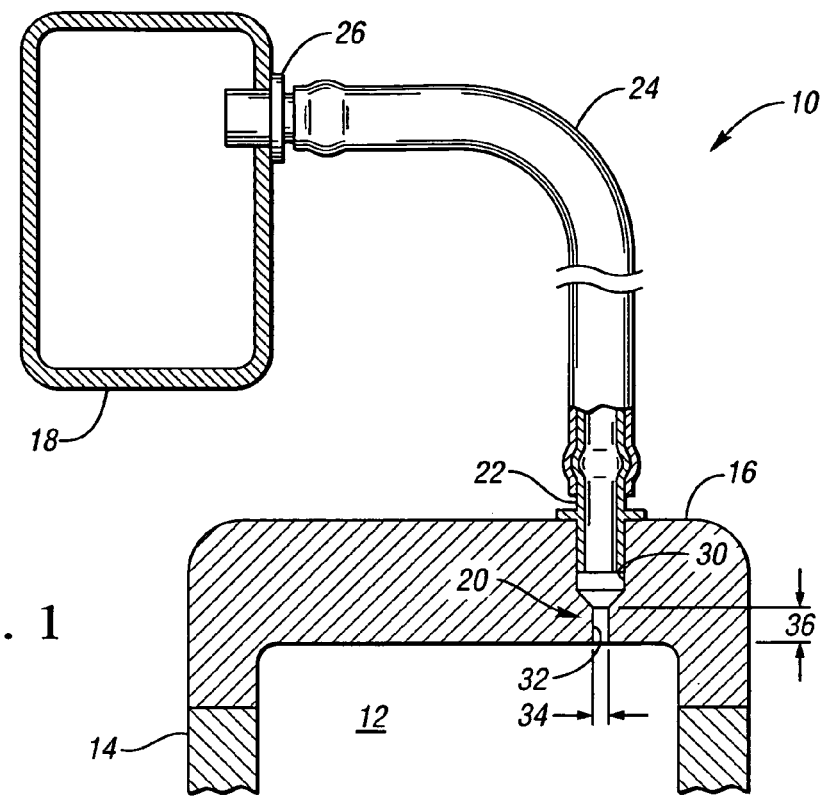
FIG. 1 is a schematic, partially cross-sectional illustration of one embodiment of a PCV system including a PCV device within the scope of the invention.

Referring to the drawings, wherein like reference numbers refer to like components, a PCV system 10 is shown in FIG. 1. The PCV system 10 allows recirculation of crankcase vapors and blow-by gasses emanating from engine cylinders, not shown but housed within the cam interior space 12 that is enclosed by a crankcase 14 and a cylinder head cam cover 16. The engine cylinders are contained within the crankcase 14 below the cam cover 16. The PCV system 10 routes the crankcase vapors from the interior space 12 to an air intake portion 18. The air intake portion 18 may be an intake manifold or an intake passage to the cylinders of the engine, as is understood by those skilled in the art.

The PCV system 10 includes a PCV device 20 which is operatively connected with a tubular fitting 22 mounted on the cam cover 16. The PCV system 10 also includes a passage member 24, also referred to as a PCV tube, which connects between fitting 22 and a second fitting 26 mounted on the air intake portion 18. A flow path is formed from the interior space 12 to the air intake portion 18 for routing crankcase vapors. As used herein "flow path" means the route which vapors travel to move from the interior space 12 to the air intake portion 18. The flow path includes the PCV device 20, the tubular fitting 22, the passage member 24, and second fitting 26.

In the embodiment of FIG. 1, the PCV device 20 is formed by the cam cover 16. A first cylindrical opening 30 connects with an internal flow passage 32, also referred to herein as an elongated restriction orifice, to allow venting of crankcase vapors from the interior space 12 though the cam cover 16. The internal flow passage 32 is generally cylindrical, i.e., tubular, and substantially linear. The internal flow passage 32 has a diameter 34 and a length 36. The ratio of the length 36 to the diameter 34 attenuates noise generated by flow of crankcase air though the internal flow passage 32. The length is preferably not less than 4 mm. The ratio of the length 36 to the diameter 34 is not less than 1.5 and preferably is greater than 2.0. The noise reduction capability of the PCV device 20 is illustrated and will be discussed with respect to FIG. 4.

It should be appreciated that the diameter 34 of the internal flow passage 32 is the greatest flow restriction in the flow path formed between the interior space 12 and the air intake portion 18. That is, the flow path consisting of the PCV device 20, the tubular fittings 22, 26 and the passage member 24 has no cross-sectional diameter with a value less than the diameter 34.

Figure 2:
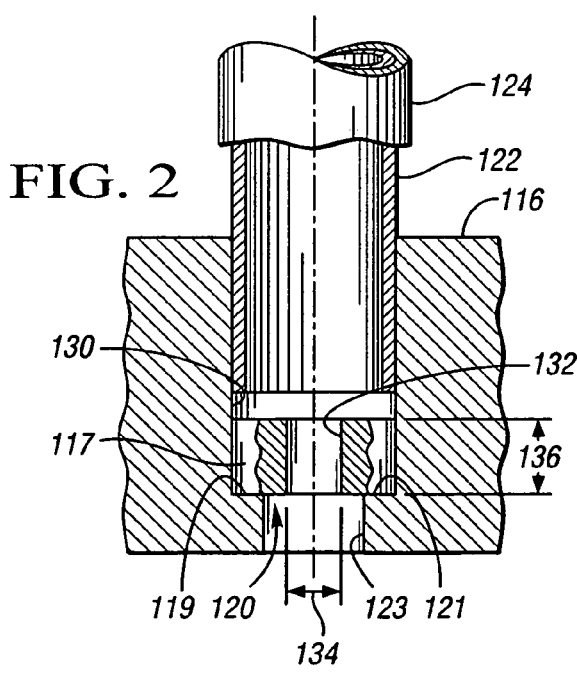
FIG. 2 is a fragmentary, cross-sectional illustration of a second embodiment of a PCV device for use in a PCV system.

Referring to FIG. 2, another embodiment of a PCV device 120 is illustrated. PCV device 120 is press-fit into a first cylindrical opening 130. The first cylindrical opening 130 is machined, cast or molded in a cam cover 116. The PCV device 120 includes a structural member 117 which is an annular disk and may be referred to as annular disk 117. An outer diameter of the annular disk 117 is sized to allow a secure, rigid connection when press fit within the first cylindrical opening 130. The annular disk 117 rests against shoulder portions 119, 121 formed by the cam cover 116 where a first cylindrical opening 130 joins a second cylindrical opening 123. The first and second cylindrical openings 130, 123 are machined, cast, molded or otherwise formed in the cam cover 116. The annular disk 117 may be a metal with material properties suitable to ensure a secure, leak free fit when placed adjacent to cam cover 116 within the first cylindrical opening 130. Alternatively, the annular disk 117 may be a rigid plastic material. A tubular fitting 122 is operatively connected to the cam cover 116 in fluid communication with the first cylindrical opening 130. The passage member 124 is in fluid communication with an air intake portion, similar to the fluid communication between passage 24 and air intake portion 18 of FIG. 1, to complete fluid communication between an interior space below the cam cover 116 of FIG. 2 to an air intake portion of an engine.

The annular disk 117 includes as internal passage 132 through a center portion thereof. The internal flow passage 132 has a diameter 134 and a length 136. The diameter 134 and length 136 are sized to provide a length to diameter ratio that attenuates noise generated by flow through the annular disk 117, as described above with respect to the embodiment of FIG. 1.

The diameter 134 of the annular disk 117 is the smallest diameter flow restriction in a flow path formed between an interior space of a crankcase to which the cam cover 116 is connected and an air intake portion to which the passage member 124 is connected. Thus, a flow path between the interior space and air intake portion has a flow rate that is at least partially controlled by the restrictive diameter 134.

Figure 3:
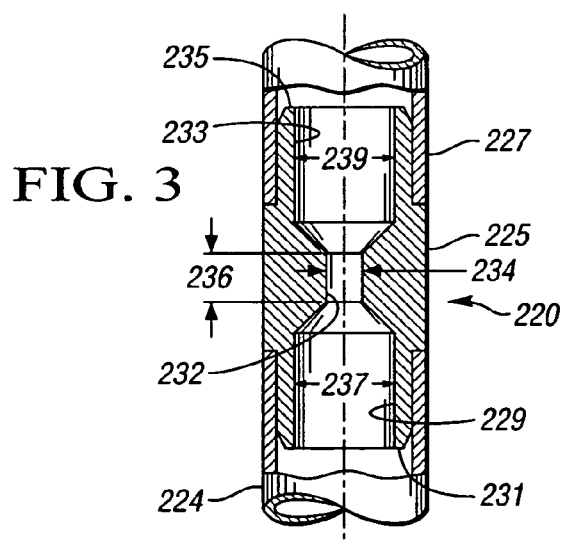
FIG. 3 is a partially fragmentary cross-sectional illustration of a third embodiment of a PCV device for use in a PCV system.

Referring to FIG. 3, another embodiment of a PCV device 220 is illustrated. The PCV device 220 is a tubular fitting 225 that forms an internal flow passage 232. The internal flow passage 232 has a diameter 234 and a length 236. The diameter 234 and length 236 are sized within the limits described with respect to the embodiment of FIG. 1 in order to provide the desired length to diameter ratio discussed above.

Unlike the embodiment of FIGS. 1 and 2, the PCV device 220 is connected between passage member 224 and a second passage member 227, both of which are tubular. The passage member 224 fluidly connects with a cam cover (not shown but similar to cam cover 16 with a tubular fitting similar to fitting 22 shown in FIG. 1). Passage member 227 in turn connects to an air intake portion similar to passage member 24, utilizing a fitting such as fitting 26 shown in FIG. 1. The diameter 234 of the internal flow passage 232 is the smallest diameter flow restriction in a flow path between an interior space and an air intake portion formed utilizing the passage members 224 and 227 and fitting 225. The fitting 225 has an inlet passage 229 formed at one end 231 and an outlet passage 233 formed at a second opposing end 235. A diameter 237 of the inlet passage 229 and a diameter 239 of the outlet passage 233 are both greater than the diameter 234 the internal flow passage 232. Accordingly, the diameter of the internal flow passage 232 acts as a restrictive orifice in the flow path between an interior space below the cam cover and an air intake portion.

Figure 4:
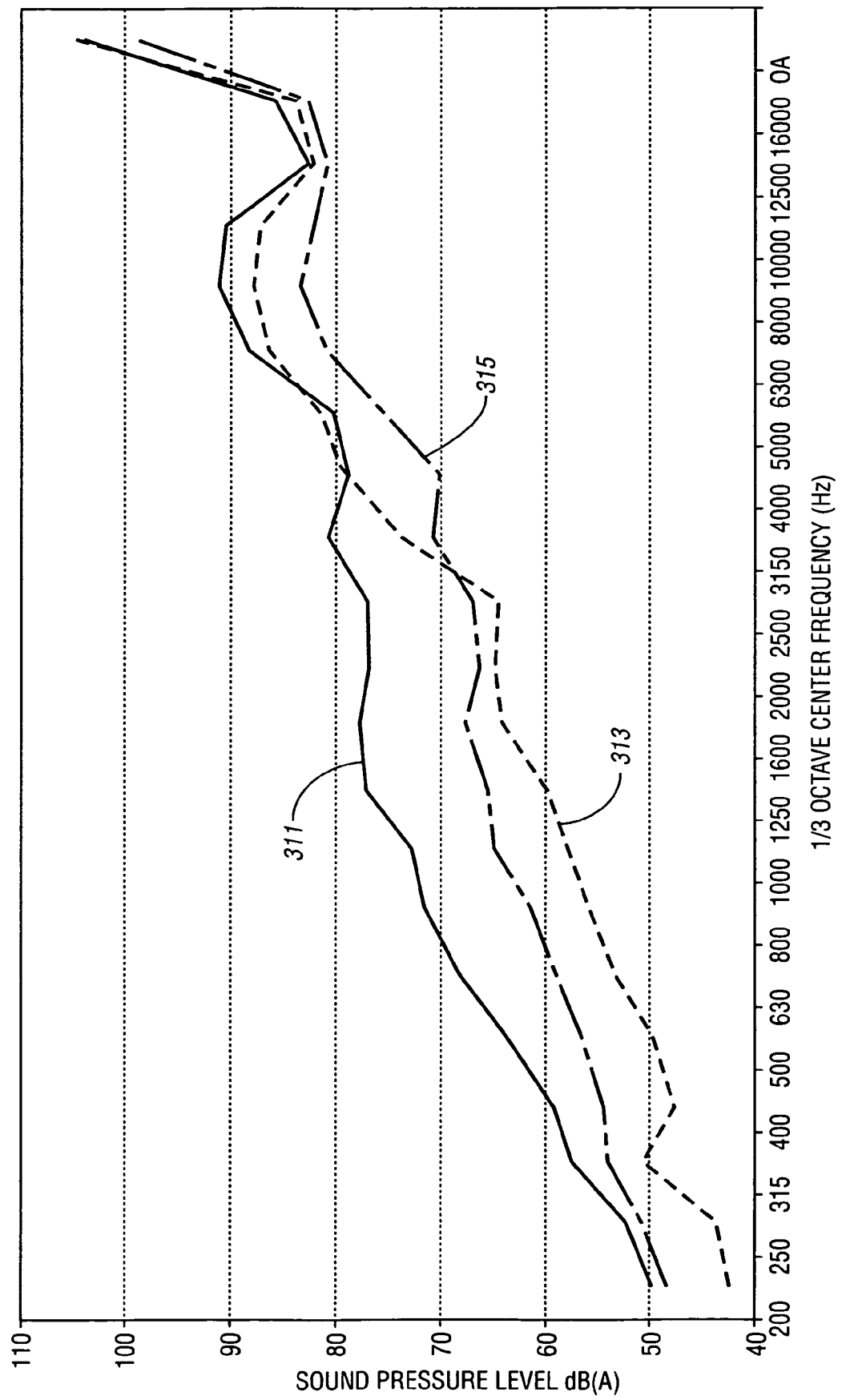
FIG. 4 is a chart illustrating reduction in noise achieved by a PCV device of FIG. 1.

Referring to FIG. 4, a chart of sound pressure level (measured in A-weighted Decibels) versus 1/3 Octave Center frequency (measured in Hertz) of various flow control devices is shown. The charted curve resulted from a flow bench study utilizing a V8 engine. Curve 311 represents the sound pressure level achieved at various frequencies using a flow control device with two inlet orifices and an expansion chamber. The flow control device that resulted in curve 311 did not have an internal flow passage with a length to diameter ratio not less than 1.5 and not greater than 3.0, did not have a length not less than 4.0 mm and did not have a diameter not less than 1.0 mm and not greater than 3.0 mm. The curve 313 represents the sound pressure level achieved at various 1/3 Octave frequencies of a conventional spring loaded poppet style PCV valve. Finally, the curve 315 represents the sound pressure level achieved at various 1/3 Octave frequencies for a PCV device having a structural member with an internal flow passage having the desired ratio of length to diameter as described with respect to the embodiments of FIGS. 1 to 3 herein. Specifically, curve 315 results from the PCV device described with respect to FIG. 1. This noise data was measured on a flow bench which simulates the proper flow rates through the PCV restriction. Similar data, showing the same result, was measured on a vehicle with a running engine, although the flow "hiss" noise is more difficult to discern in the data due to engine background noise. On a running engine (vehicle) subjective evaluations show a similar result to the flow bench conclusions.

Figure 5:
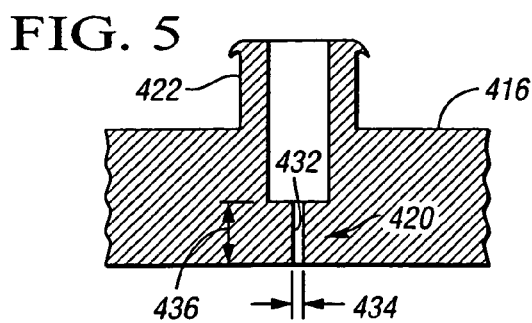
FIG. 5 is a partially fragmentary cross-sectional illustration of a fourth embodiment of a PCV device for use in a PCV system.

FIG. 5 shows another embodiment of a PCV device 420 that is integral with a cam cover 416. A tubular fitting 422 configured for connection with PCV tubing is also integrally formed with the cam cover 416. The PCV device 420 has an internal flow passage 432 that has a diameter 434 and length 436. The diameter 434 and length 536 are sized to provide a length to diameter ratio that attenuates noise generated by flow through the internal flow passage 432, as described above with respect to the embodiment of FIG. 1.

Accordingly, the PCV devices described with respect to FIGS. 1 to 3 and FIG. 5 allow a reduction in noise caused by flow of re-circulating crankcase air between the crankcase and air intake portion. Each of the devices of FIG. 1 through 3 and FIG. 5 involves a minimum number of components. In fact, the devices of FIGS. 1 and 5 require no additional components, as the internal flow passage of the PCV device is formed by, machined or otherwise provided in a cam cover 16, 416, respectively. PCV device 120 of FIG. 2 is a single component, the annular disk 117. Likewise, the PCV device of FIG. 3 is a single component, the tubular fitting 225.

While the best modes for carrying out the invention have been described in detail, those familiar with the art to which this invention relates will recognize various alternative designs and embodiments for practicing the invention within the scope of the appended claims.

The invention claimed is:

1. A positive crankcase ventilation (PCV) device for recirculation of crankcase air, comprising:
   a structural member having a tubular, substantially linear internal flow passage characterized by a length and a diameter; wherein said diameter acts as a restrictive orifice to at least partially control flow volume through said structural member; wherein a ratio of said length to said diameter attenuates noise generated by flow of crankcase air through said passage;
   wherein said structural member is directly and rigidly secured within an opening in a cam cover; and wherein said structural member is a substantially annular disc pressed into said opening, and wherein said ratio of length to said diameter is not less than 1.5 and not greater than 3.0.

2. The PCV device of claim 1, wherein said length is not less than 4.0 mm.

3. The PCV device of claim 1, wherein said diameter is not less than 1.0 mm and not greater than 3.0 mm.

4. A PCV system for an engine, the engine having a crankcase and an air intake portion, the PCV system comprising:
   a passage member partially establishing fluid communication between the crankcase and the air intake portion to conduct crankcase air to the air intake portion; and
   a structural member in fluid communication with said passage member, said structural member having a tubular, substantially linear internal flow passage further establishing fluid communication between the crankcase and the air intake portion, wherein the structural member is directly and rigidly secured within an opening in a cam cover; wherein said internal flow passage is characterized by a length and a diameter; wherein a ratio of said length to said diameter attenuates noise generated by flow of crankcase air through said internal flow passage; wherein said passage member is characterized by an internal diameter greater than said diameter of said internal flow passage; and wherein said PCV system is characterized by an absence of any flow restriction of a smaller diameter than said diameter of said internal flow passage such that said internal flow passage controls a flow rate from said crankcase to said air intake portion; and wherein said ratio of said length to said diameter is not less than 1.5 and not greater than 3.0.

5. The PCV system of claim 4, wherein said length is not less than 4.0 mm and not greater than 5.0 mm.

6. The PCV system of claim 4, wherein said structural member is a cam cover; and further comprising:
   a tubular fitting connected between said passage member and said cam cover.

7. The PCV system of claim 4, wherein said structural member is an integral portion of a cam cover; and wherein said cam cover also integrally forms a tubular fitting.

8. The PCV system of claim 4, wherein said structural member is rigidly secured within an opening in a cam cover and further comprising:
   a tubular fitting connected between said passage member and said cam cover.

9. The PCV system of claim 4, wherein said structural member is a substantially tubular fitting having opposing first and second ends, wherein said internal flow passage is formed between said ends; and wherein one of said ends is adapted for connection with said passage member.

* * * * *